United States Patent
Folliot et al.

(10) Patent No.: US 6,729,598 B2
(45) Date of Patent: May 4, 2004

(54) MOTOR-DRIVEN SUPPORT DEVICE FOR ADJUSTING A VEHICLE SEAT HAVING VISCOELASTIC SLEEVE

(75) Inventors: Dominique Folliot, Flers (FR); Jean-Luc Bouhelier, Flers (FR); Sylvain Desquesne, Conde sur Noireau (FR); Didier Gallienne, Landigou (FR)

(73) Assignee: Faurecia Sieges d'Automobile S.A., Boulogne (FR)

( * ) Notice: Subject to any disclaimer, the term of this patent is extended or adjusted under 35 U.S.C. 154(b) by 344 days.

(21) Appl. No.: 09/847,238

(22) Filed: May 2, 2001

(65) Prior Publication Data
US 2001/0048058 A1 Dec. 6, 2001

(30) Foreign Application Priority Data

| May 5, 2000 | (FR) | 00 05783 |
| Mar. 23, 2001 | (FR) | 01 03945 |

(51) Int. Cl.$^7$ ............................................. F16M 1/00
(52) U.S. Cl. ....................................... 248/671; 248/674
(58) Field of Search ................... 248/671, 672, 248/674, 675, 676, 606; 310/91

(56) References Cited

U.S. PATENT DOCUMENTS

| 2,209,477 A | * | 7/1940 | Reibel |
| 2,575,858 A | * | 11/1951 | Bennett |
| 2,885,142 A | * | 5/1959 | Eberhart |
| 3,685,773 A | * | 8/1972 | Otto ............................ 248/26 |
| 5,467,957 A | | 11/1995 | Gauger ....................... 248/429 |
| 5,810,322 A | * | 9/1998 | Zhao et al. .................. 248/675 |

FOREIGN PATENT DOCUMENTS

| DE | 199 39 255 | 2/2000 |

OTHER PUBLICATIONS

Search Report issued by the French Patent Office for parent French Application No. 00 05783 filed on May 5, 2000; report dated Jan. 19, 2001.

* cited by examiner

Primary Examiner—Gwendolyn Baxter
(74) Attorney, Agent, or Firm—Marshall, Gerstein & Borun LLP

(57) ABSTRACT

A motor-driven adjustment device for a vehicle seat is disclosed which may comprise a motor provided with a casing having two projecting endpieces in a support to which the casing is fixed. The two endpieces of the casing are received in viscoelastic sleeves which are elastically engaged in respective cradles for support so as to prevent rotation relative thereto, the casing being connected to the support solely by the sleeves.

13 Claims, 9 Drawing Sheets

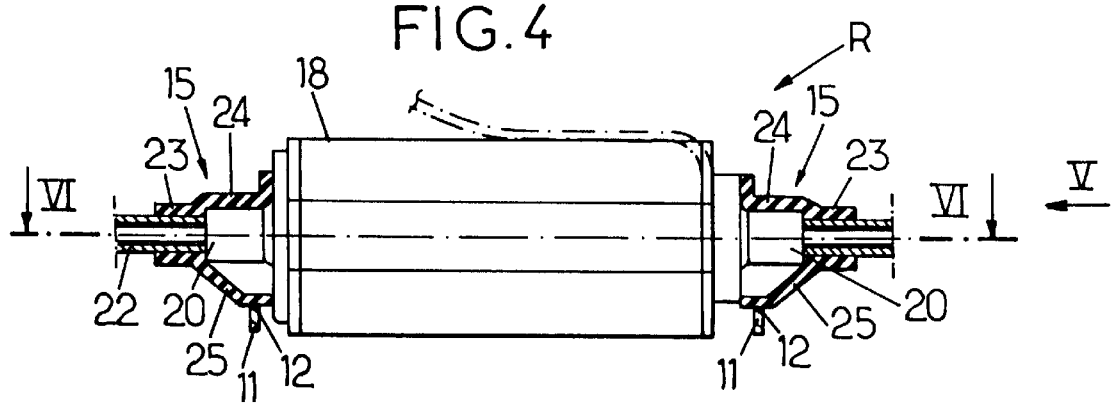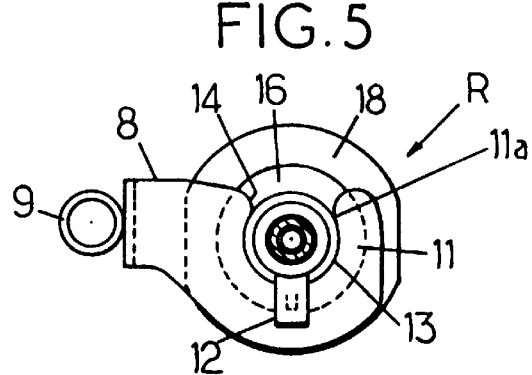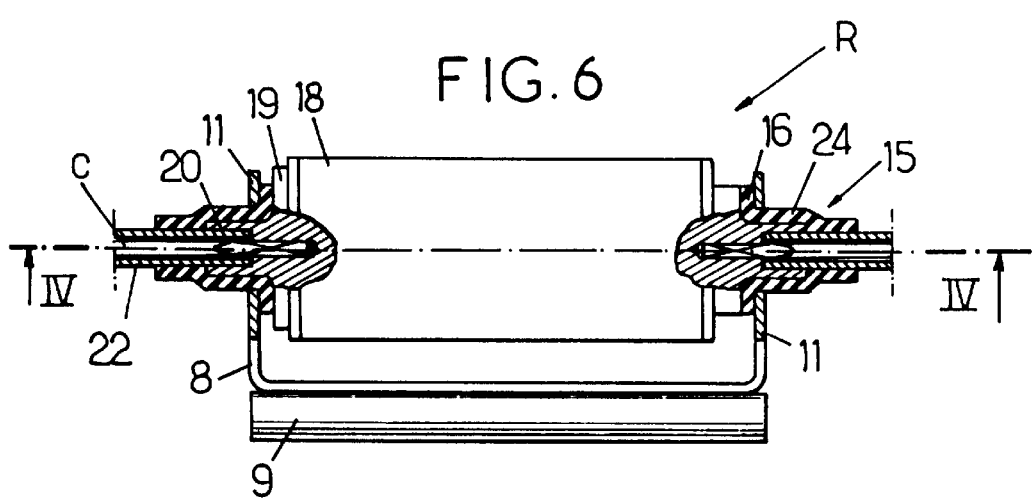

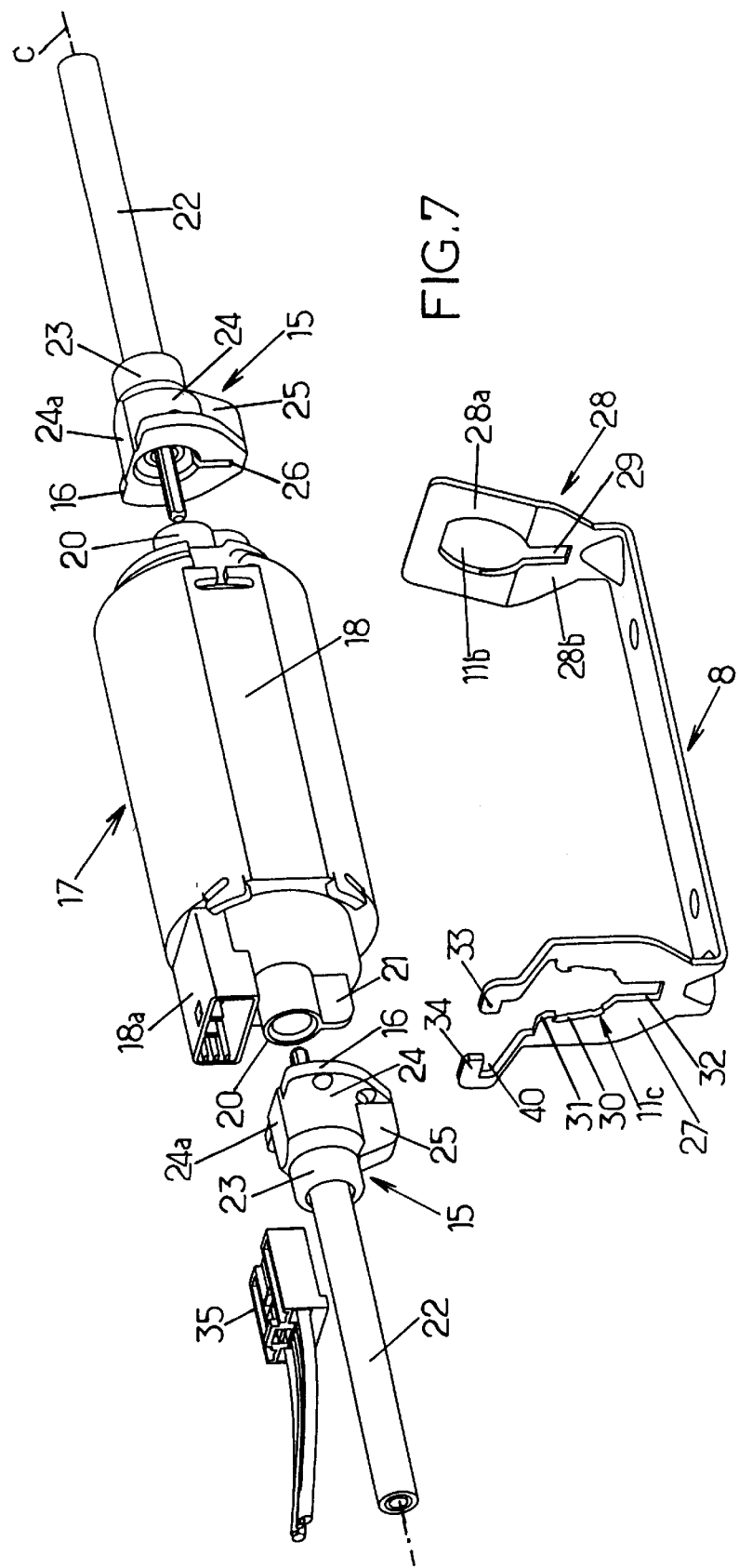

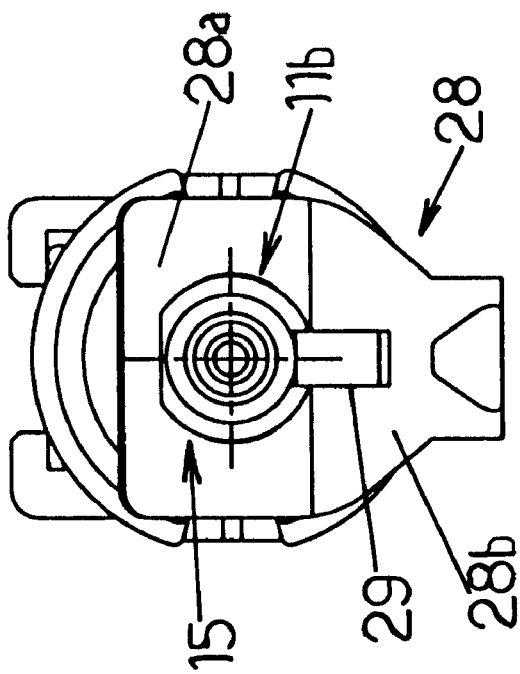
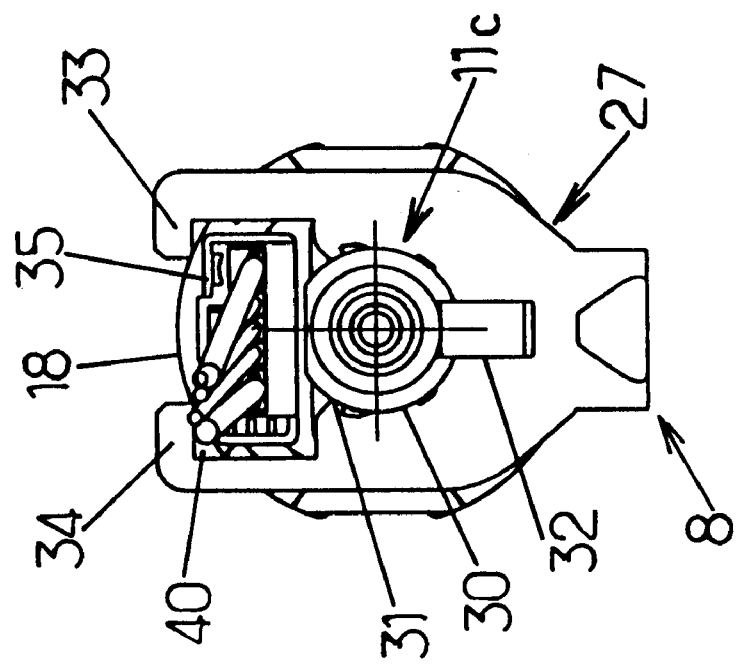
FIG.11
FIG.10

MOTOR-DRIVEN SUPPORT DEVICE FOR ADJUSTING A VEHICLE SEAT HAVING VISCOELASTIC SLEEVE

FIELD OF THE INVENTION

The present invention relates to motor-driven devices for adjusting vehicle seats.

More particularly, the invention relates to a motor-driven adjustment device for a vehicle seat, the device comprising firstly a motor comprising a casing with two projecting endpieces which are rigid and opposite, being in alignment on a central axis, at least one of the endpieces having a rotary outlet member passing therethrough, and secondly a support to which the casing of the motor is fixed.

BACKGROUND OF THE INVENTION

The motor casing is generally fixed to the support by means of a plurality of nuts-and-bolts, such that fixing the motor on the support requires installation time that is relatively lengthy, thus implying high installation and production costs.

In addition, since the motor is placed in a relatively small space, access to the screw-tightening zones is often difficult, thereby further increasing difficulty and lengthening installation time.

Furthermore, once the motor has indeed been fixed on its support, the connections via bolts frequently give rise to motor vibration being transmitted to the support and thus to the vehicle seat structure as a whole. It will thus be understood that when a user adjusts the position of the seat, this vibration can give rise to feelings that are uncomfortable and to noise that is objectionable.

OBJECTS AND SUMMARY OF THE INVENTION

A particular object of the present invention is to mitigate those drawbacks, by proposing a motor-driven adjustment device which can be assembled simply and quickly while reducing production costs.

The invention achieves this object by the facts that the two endpieces of the casing are received in non-rotatable manner in first and second viscoelastic sleeves which are resiliently engaged in respective first and second cradles formed on support plates constituting the support, and that said first and second cradles and the first and second sleeves are of shapes adapted to prevent the casing from moving on the support angularly, axially and radially relative to the central axis, said casing being connected to the support solely by means of the sleeves.

By means of these dispositions, the motor-driven adjustment device of the invention enables the elastically deformable sleeves of the casing to be engaged resiliently and snap-fastened directly in the cradles of appropriate shape of the support, with this requiring the operator to perform a single manual action that is simple.

Thus, the presence of the elastically deformable intermediate sleeves enables the casing of the motor to be assembled simply and quickly to the support, while significantly limiting the amount of vibration that is transmitted from the motor to the support, and thus to the vehicle seat.

In preferred embodiments of the invention, use may optionally be made of one or more of the following dispositions:

each sleeve is provided with a flange at one of its ends, said flange being disposed between one of the cradles of the support and the casing of the motor so as to prevent the motor from moving axially relative to the support;

each of said first and second cradles has a cylindrical internal bearing surface of diameter substantially identical to the outside diameter of the first and second sleeves and has an opening of a width that is less than the outside diameter of the first and second sleeves so as to enable the casing to be snap-fastened to the support and prevented from moving radially relative thereto;

the first and second cradles are provided with respective notches for co-operating with respective keys formed on the outlines of the corresponding first and second sleeves so as to prevent the casing moving angularly relative to the support;

the outlet member of the motor comprises a rotary cable surrounded by a flexible sheath;

the flexible sheath is stuck to the inside of the corresponding sleeve;

the flexible sheath is stuck to the inside of the corresponding endpiece of the casing;

each rigid endpiece is provided with an external key received in a groove of complementary shape formed inside the corresponding sleeve in order to prevent said sleeve from moving angularly relative to the endpiece;

the two support plates are made as a single piece;

the second cradle is formed by a window having a closed outline substantially identical to the outline of the second sleeve, the second sleeve being elastically engaged in said window, and the first cradle has an internal bearing surface substantially identical to the outline of the first sleeve together with an opening of width that is smaller than the outline of said first sleeve so as to enable it to be snap-fastened to said first cradle and prevented from moving radially relative thereto;

each of the first and second cradles has an internal bearing surface that is substantially identical to the outline of the first and second sleeves, together with a respective opening of width greater than the smallest width of the outline of said first and second sleeves so as to enable them to be inserted in the first and second cradles, and the first and second sleeves are provided with respective keys for snap-fastening in corresponding notches formed in the internal bearing surfaces of the first and second cradles, by turning the casing of the motor about its central axis;

the support plate of the first cradle has a passage which, when the first sleeve is snap-fastened to the first cradle, is disposed in register with a first electrical connector provided on the casing of the motor, said passage being designed to receive a second electrical connector connected to the first electrical connector and designed to co-operate with said second electrical connector to lock the first sleeve in its snap-fastened position relative to the first cradle; and the passage comprises two branches disposed on either side of the opening of the first cradle, said branches having respective free ends extending towards each other so as to enable the second electrical connector to be put into abutment between the first sleeve and said branch ends extending towards each other.

The invention also provides a motor vehicle seat having at least two portions that are adjustable relative to each other by means of a drive device connected to an outlet member of a motor-driven adjustment device as defined above.

BRIEF DESCRIPTION OF THE DRAWINGS

FIG. 4 is a section view on line IV—IV of FIG. 6 showing the adjustment device constituting a first embodiment of the invention;

FIG. 5 is an end view of the FIG. 4 adjustment device;

FIG. 6 is a section view on line VI—VI of FIG. 4 of the device constituting the first embodiment of the invention;

FIG. 7 is an exploded perspective view of a second embodiment of the seat adjustment device;

FIG. 10 is an end view of the FIG. 9 adjustment device;

FIG. 11 is an end view of the FIG. 9 adjustment device;

MORE DETAILED DESCRIPTION

In the various figures, the same references are used to designate elements that are identical or similar.

Figure 1:
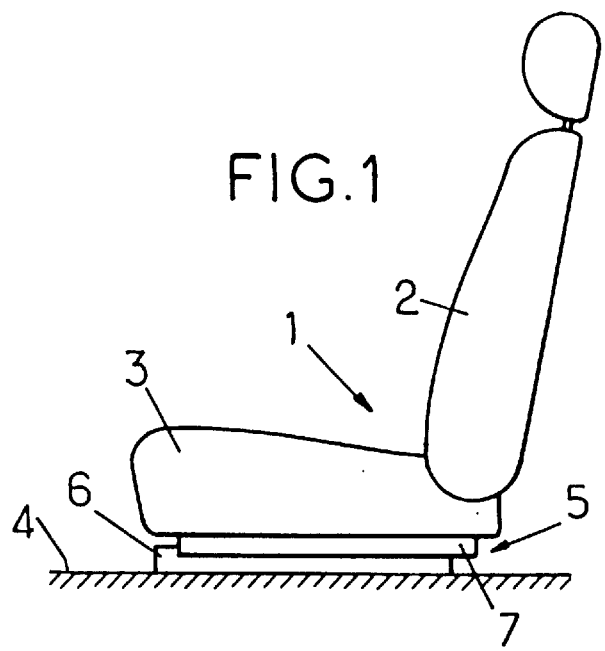
FIG. 1 is a diagrammatic view of a vehicle seat fitted with an adjustment device constituting an embodiment of the invention.

FIG. 1 shows a vehicle seat, in particular a front seat of a motor vehicle, the seat comprising a back 2 mounted on a seat proper 3. The seat proper 3 is connected to the floor 4 of the vehicle via two parallel and longitudinally-extending runners 5, only one of which is visible in FIG. 1.

Each of the runners 5 comprises a fixed rail 6 secured to the floor 4 of the vehicle and a moving rail 7 slidably mounted so as to enable a user to adjust the longitudinal position of the seat by means of at least one drive device 10 drivingly connected to an adjustment device of the invention. Each of the drive devices 10 can comprise a worm-screw and nut system carried by the runners 5, and they are controlled to operate synchronously by a motor-driven adjustment device R generally disposed transversely between the two parallel runners 5.

Figure 3:
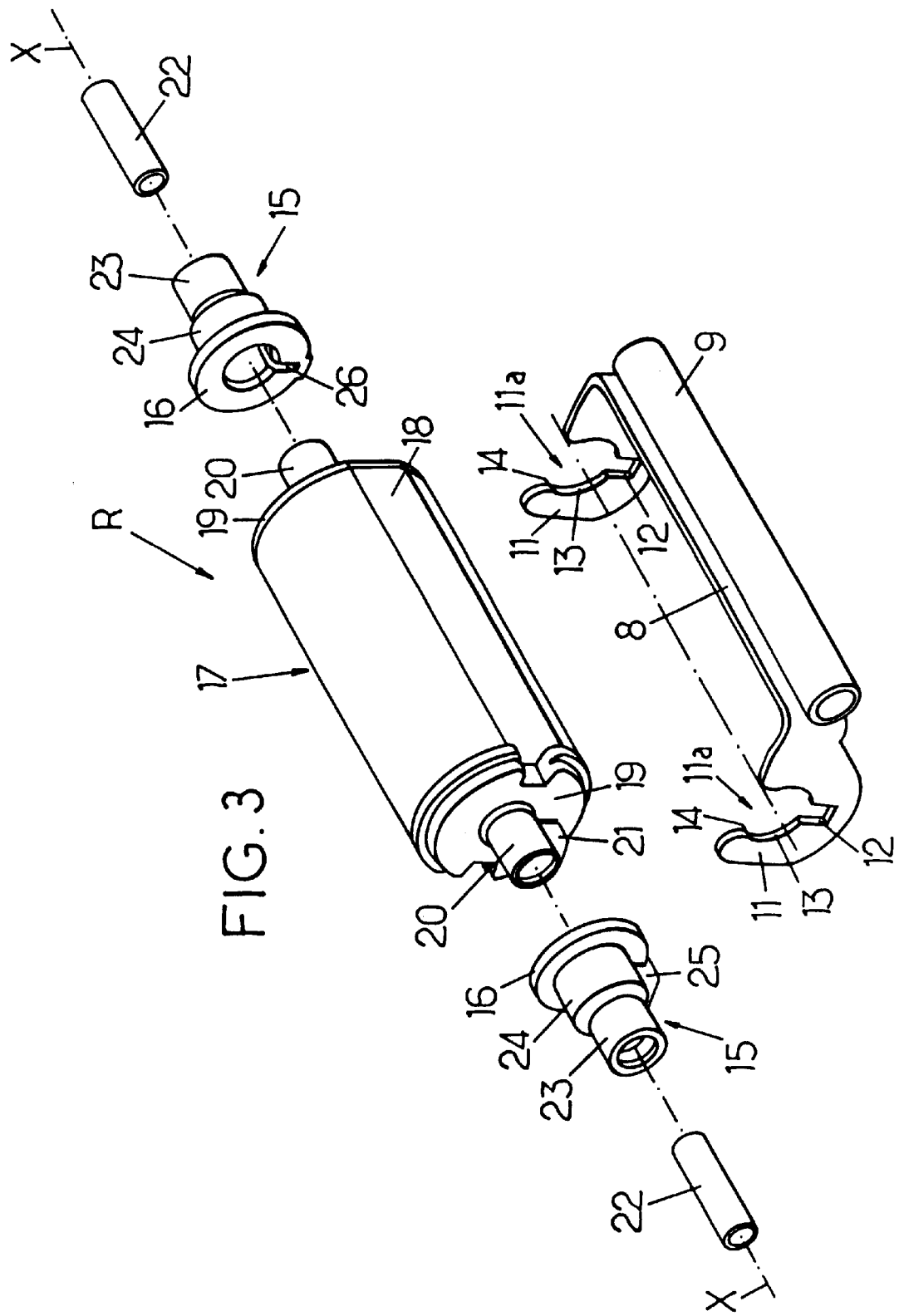
FIG. 3 is an exploded perspective view of a first embodiment of the FIG. 1 seat adjustment device.

As can be seen in FIG. 3, this motor-driven adjustment device comprises a motor 17 whose case 18 has a projecting endpiece 20 at each of its two ends, which endpieces are rigid and opposite and in alignment on a central axis X. Each of these two endpieces 20 has a rotary outlet member passing therethrough, which member is connected to one of the drive devices 10 for the runners 5 so as to adjust the longitudinal position of the vehicle seat. This rotary outlet member is described in greater detail below.

It will be observed that, where appropriate, the adjustment device R need have only one outlet member passing through only one of the endpieces 20, without thereby going beyond the ambit of the invention.

Each projecting endpiece 20 shown in FIG. 3 is in the form of a single piece including an intermediate element 19 which constitutes one of the transverse ends of the casing 18.

The two intermediate elements 20 can be made of rigid plastics material, for example.

Figure 2:
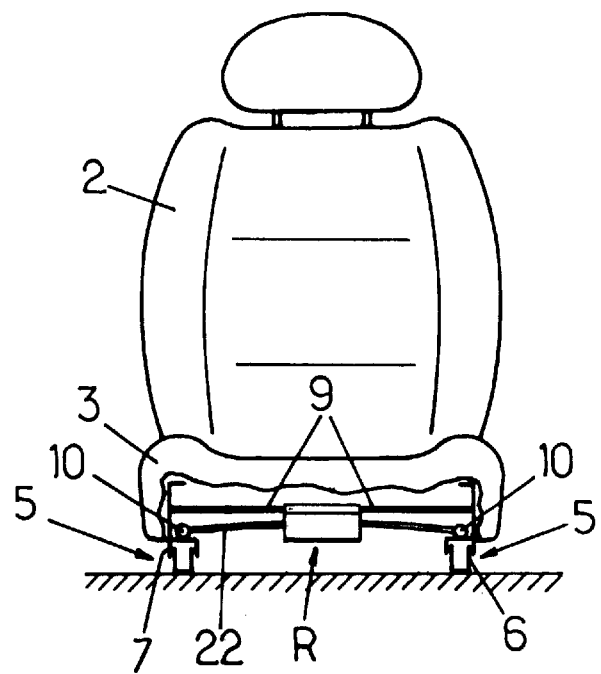
FIG. 2 is a front view, partially in section, of the FIG. 1 vehicle seat.

The motor-driven adjustment device also comprises a support 8 on which the motor 17 is designed to be installed in order to be secured to the vehicle seat. As can be seen in FIGS. 2 and 3, the support 8 is carried by a cross-member 9 which is itself fixed at respective ends to cheekpieces forming parts of the structure of the seat proper 3 of the vehicle seat.

FIGS. 3 to 6 show a first embodiment of the motor-driven adjustment device of the invention. The motor support 8 is generally U-shaped, having a middle or central portion fixed to the cross-member 9 and two lateral support plates 11 which form the ends of the support 8. The supports can be made of sheet metal, or indeed from injected plastics material.

The two support plates 11 of the support 8 are provided with respective cradles 11a for holding the electric motor 17 when it is assembled on the support.

To this end, the two endpieces 20 of the casing 18 are advantageously received so as to be prevented from rotating in elastically deformable sleeves 15 that are designed to be snap-fastened in respective ones of the cradles 11a of the support 8. Each elastically deformable sleeve has a first tubular portion 23 and a second tubular portion 24 adjacent thereto, the first tubular portion 23 having an outside diameter that is smaller than that of the second tubular portion 24. Each sleeve 20 is also provided with a flange 16 at its end placed facing the casing 17. The inside wall of the first portion 23 of each sleeve is designed to receive a fixed flexible sheath 22 surrounding the rotary outlet member of the motor 17. As can be seen in FIG. 6, this rotary outlet member is constituted by a cable C which is connected to the drive device 10 of a runner 5. As shown in FIG. 6, the flexible sheaths 22 are likewise received inside the tubular endpieces 20 of the intermediate elements 19. The flexible sheath 22 is secured to the inside wall of the first tubular portion 23 of the corresponding sleeve 15 by means of adhesive, for example.

When the sheath 22 is fixed on the sleeve 15, the resulting assembly is installed on the casing 18 merely by engaging the second tubular portion 24 of the sleeve 15 on the corresponding projecting endpiece 20 of the casing 18 for the motor 17. Each sleeve 15 is engaged on an endpiece 20 until the flange 16 comes into abutment against the corresponding intermediate element 19.

Provision can also be made to coat the outer end of the flexible sleeve 22 in adhesive prior to inserting it in the tubular endpiece 20 so as to stick said sheath to the inside of the endpiece 20.

In order to prevent each sleeve 15 from rotating relative to the corresponding endpiece 20, the intermediate elements 19, or more exactly the endpieces 20, are provided with respective keys 21 (FIG. 4) for being received in respective grooves 26 of complementary shape formed in the inside walls of the second portions 24 of the sleeves 15.

In order to receive the elastically deformable sleeves 15 when installed on the casing 18, the two cradles 11a of the support 8 as shown in FIGS. 3 and 5 have respective cylindrical internal bearing surfaces 13 that are substantially identical to the outside diameter of the second portions 24 of the sleeves 15, and respective openings 14 of width that is smaller than the outside diameter of the second portions 24 of said sleeves 15.

Thus, when the sleeves 15 installed on the casing 18 are placed in register with the two openings 14 of the support, it then suffices to exert pressure, e.g. merely by an action of the hand, on the sleeves or on the casing so as to deform the sleeves 15 and/or the two branches of each cradle 11a elastically in such a manner as to enable said sleeves 15 to be inserted directly into the cradles. The sleeves thus come into contact with the cylindrical internal bearing surfaces 13 of the cradles 11a while being retained radially by the openings 14. Naturally, it would also be possible to make a sleeve in which the two portions 23 and 24 have the same outside diameter. Advantageously, the flanges 16 on the sleeves are disposed respectively between one of the cradles 11a and the outside wall of the casing 18 of the motor 17 so as to prevent the motor from moving axially relative to the support 8.

Thus, depending on the type of motor or support used, it suffices to modify the thickness of the flanges 16 of the sleeves 15 in order to ensure that the motor 17 is securely held axially by the support 8.

In order to make it possible also to prevent the motor 17 from moving angularly relative to the support, the cylindrical inside bearing surface 13 of each cradle 11a is provided with a notch 12 that receives a key 25 formed on the outside wall of each sleeve 15. Since each sleeve is already secured angularly relative to the casing 18 by co-operation between the keys 21 and the grooves 26, it will be understood that no angular displacement is possible between the motor 17 and the support 8.

Thus, since the cradles 11a of the support 8 and the elastically deformable sleeves 15 are of complementary shapes, it suffices merely to exert pressure thereon to enable the motor 17 to be snap-fastened automatically to the support 8, and thus to the vehicle seat.

The term "snap-fastening" is used herein to mean that the motor is locked on the support merely by applying pressure thereto or to its sleeves 15 so as to cause the sleeves to be retained in the corresponding cradles of the support.

FIGS. 7 to 11 show a second embodiment of the motor-driven adjustment device of the invention. In this embodiment, the motor support 8 is likewise generally U-shaped, comprising a middle or central portion for fixing to the cross-member 9 (FIG. 1) and two lateral support plates 27 and 28 forming the ends of the support 8. The support plate 28 has a base portion 28b which extends substantially perpendicularly relative to the middle portion of the support 8, and an end portion 28a that slopes at an angle of about 50° relative to the base portion 28b. As can be seen in FIG. 7, the cradle 11b formed on the support plate 28 comprises a window 11b with a closed outlet that is substantially identical to the outline of the sleeves 15 that is to be associated therewith. This sleeve 15 has a flat 24a on its second tubular portion 24. The window 11b also has a notch 29 for co-operating with the key 25 formed on the sleeve 15. The notch 29 is preferably made in the base portion 28b of the support plate 28 of the support 8. The support plate 27 has a cradle 11c with an internal bearing surface 30 that is substantially identical to the outline of the sleeve 15 which is associated therewith, and an opening 31 of width that is likewise smaller than the outline of the sleeve 15, or more precisely smaller than the outside diameter of the second tubular portion 24 of the sleeve 15. The internal bearing surface 30 of the cradle 11c is also provided with a notch 32 for receiving the key 25 of the sleeve 15. The support plate 27 of the support 8 also has two branches 33 and 34 disposed on either side of the opening 31 of the cradle 11c. These two branches 33 and 34 have free ends that extend towards each other, thus defining a passage 40 for enabling a first electrical connector 18a disposed on the casing 18 to make electrical connection with a second electrical connector 35. In particular, the electrical connector 35 can be connected to members for controlling the position of the seat and situated on the armrest of said seat, for example.

Figure 8:
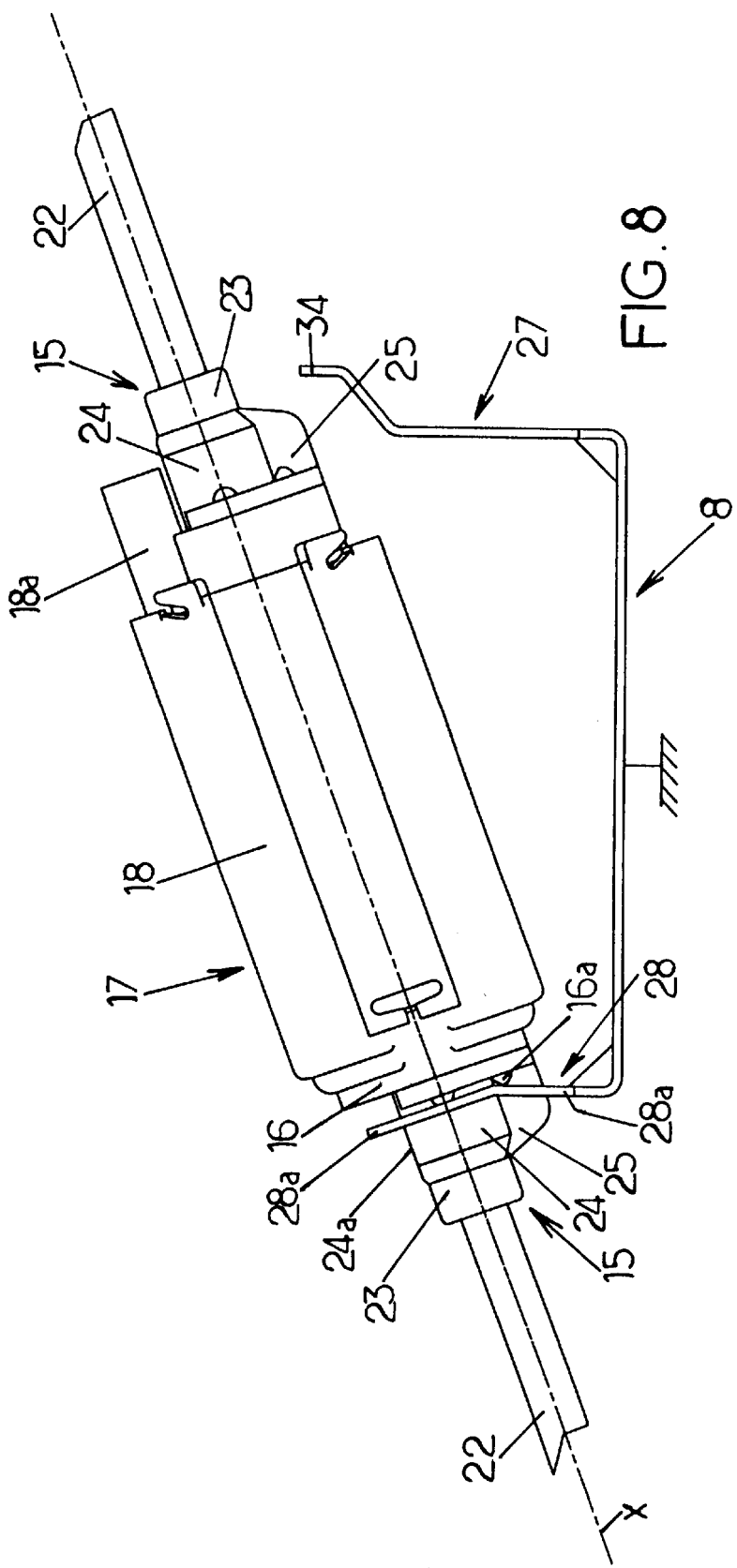
FIGS. 8 and 9 are front views showing steps in installing the adjustment device constituting the second embodiment of the invention.
Figure 9:
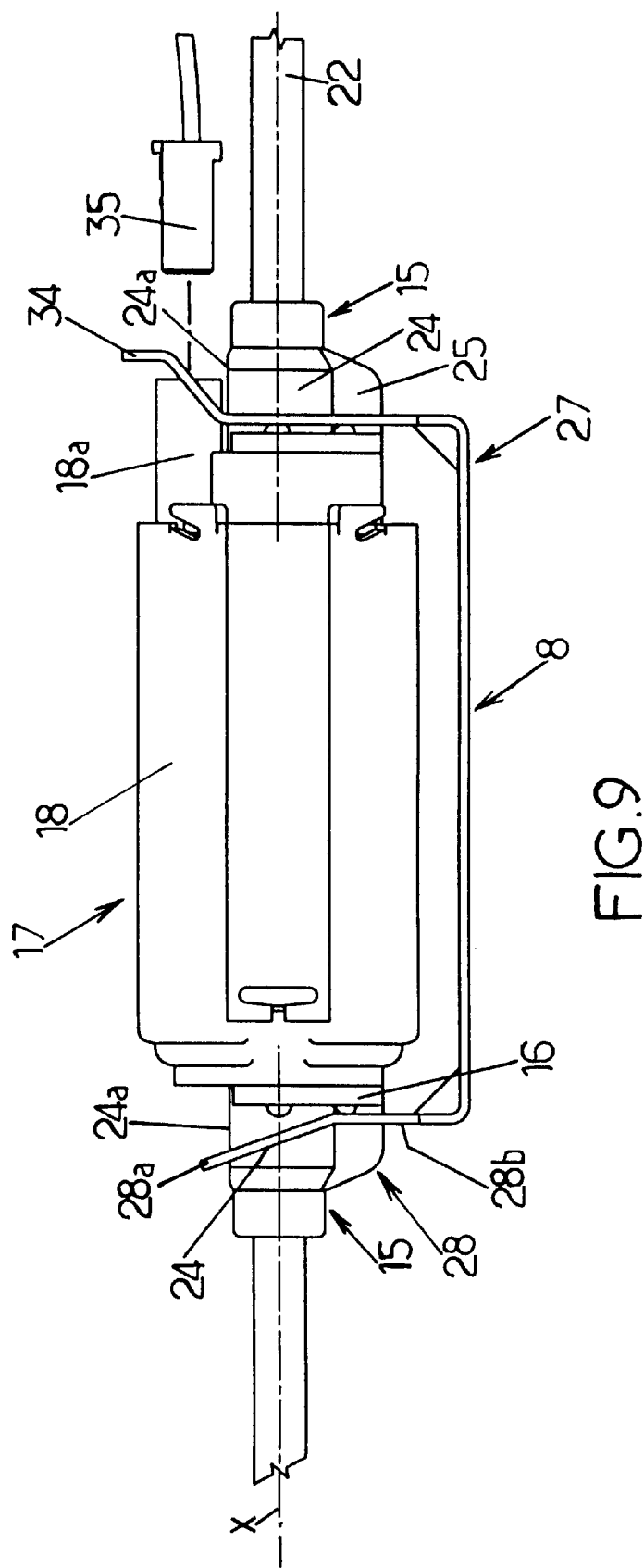

The casing 18 is put into place on the support 8 in a manner that is described below with reference to FIGS. 8 to 11. Firstly, the casing 18 is held in such a manner that is central axis X is an angle of about 20° relative to the middle portion of the support 8, the central axis X then being substantially perpendicular to the end portion 28a of the support plate 28. Thereafter, the sleeve 15 is inserted by resilient engagement into the window 11b of the support plate 28, as shown in FIG. 8, and until the projecting elements 176a provided on the flange 16 of the sleeve 15 come into abutment against the sloping portion 28a of the plate 28. Thereafter, the casing 18 is pivoted in the window 11b of the support plate 28 so that the second sleeve 15 mounted on the casing 18 comes into register with the opening 31 of the support plate 27. It then suffices merely to apply pressure, e.g. by a manual action, on the second sleeve 15 or on the casing 18 in order to deform the sleeve 15 elastically so as to insert the sleeve 15 directly into the cradle 11c of the support plate 27, as shown in FIG. 9. In this way, the flanges 16 of the sleeve 15, or more precisely the projecting elements 16a on the flanges 16 come to bear against the support plates 27 and 28 thus preventing the casing 18 from moving axially relative to the support 8. In like manner, the resilient engagement of the sleeve 15 in the window 11b and the snap-fastening of the other sleeve 15 in the cradle 11c serve to hold the casing 18 radially and thus to hold the motor 17 radially relative to the support 8, as shown in FIGS. 10 and 11. When the sleeve 15 is snap-fastened in the cradle 11c, the two branches 33 and 34 form a passage 40 placed directly in register with the electrical connector 18a of the casing 18. Thus, as can be seen in FIG. 10, when the second electrical connector 35 is connected to the electrical connector 18a of the casing 18 while also being received in the passage 40 as defined by the inwardly-directed ends of the branches 33 and 34, said electrical connector 35 also serves to block or hold the sleeve 15 in its snap-fastened position relative to the cradle 11c. Thus, although the casing 18 is connected to the support 8 solely by means of the sleeves 15, the second electrical connector 35 nevertheless provides additional security for locking the sleeve 15 associated with the cradle 11c in its snap-fastened position. As shown in FIG. 10, it will be understood that if the sleeve 15 should accidentally become separated from the cradle 11c, then the flat 24a formed on the tubular portion 24 of the sleeve 15 would automatically come into abutment against the second electrical connector 35, thereby ensuring that the casing 18 is held together with the motor 17 relative to the support 8. The two branches 33 and 34 forming the passage 40 can also be provided on the support plates 11 of the first embodiment as described with reference to FIGS. 3 to 6.

Another embodiment of the motor-driven adjustment device of the invention is shown in FIGS. 12 to 15. In this embodiment, the motor support 8 has two support plates 36 that are distinct and that can be made of metal or of injected plastics material. The two support plates 36 are provided with identical cradles 11d for holding in like manner the electric motor 17 when it is assembled to the two support plates 16 forming the support 8. It will be observed that the support plates 36 could be interconnected so as to form a U-shaped support like the support shown in FIG. 7.

Figure 12:
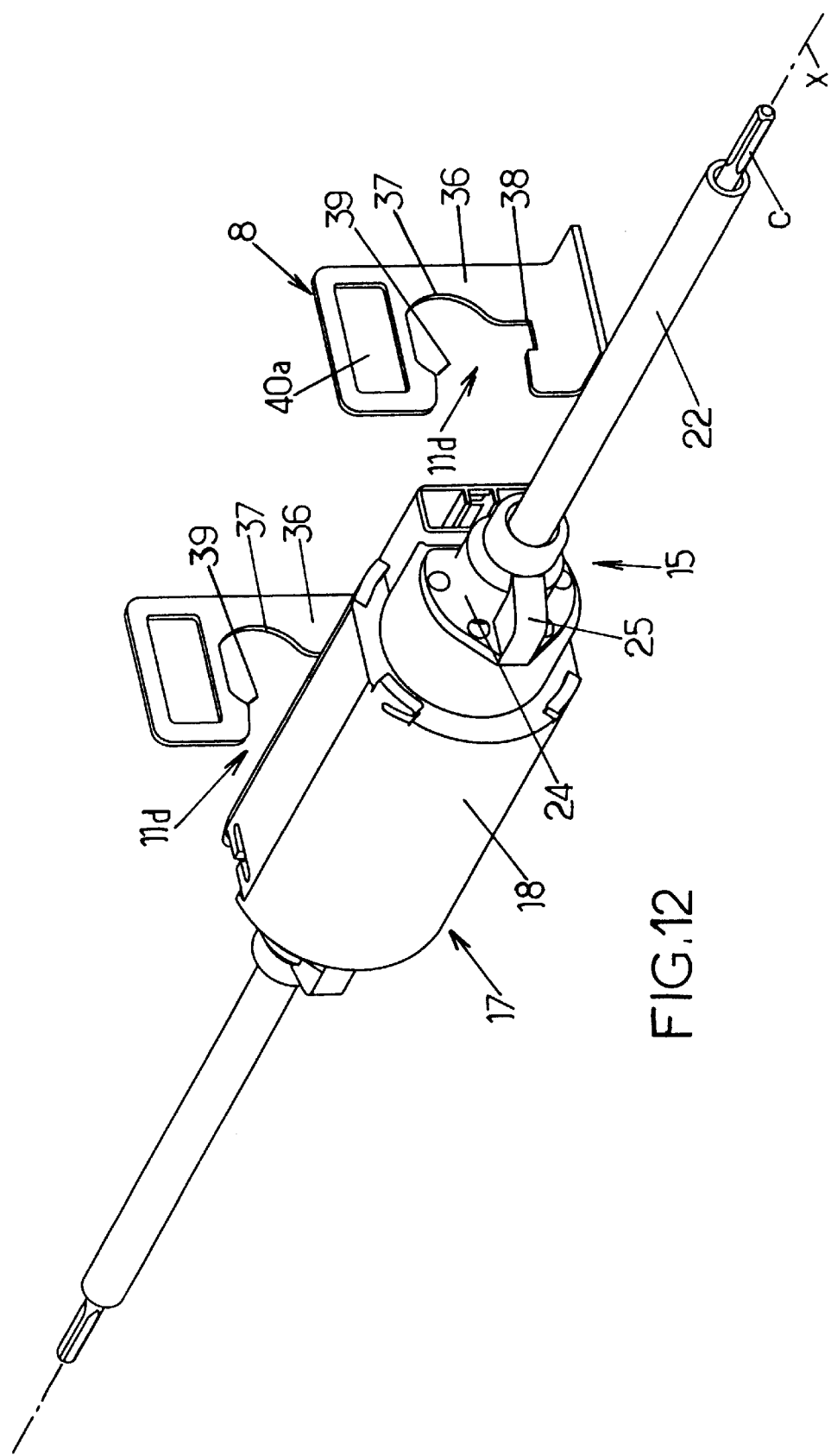
FIG. 12 is an exploded perspective view of a third embodiment of the seat adjustment device of the invention.
Figure 15:
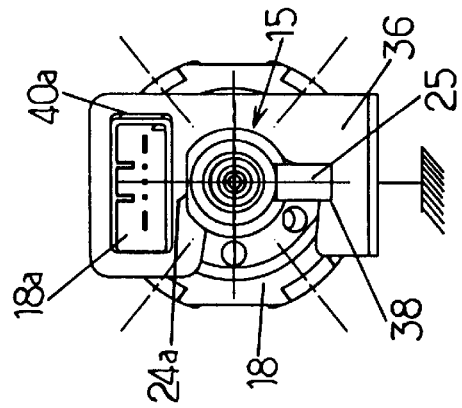
FIGS. 13 to 15 are end views showing different steps in installing the adjustment device constituting the third embodiment of the invention.
Figure 14:
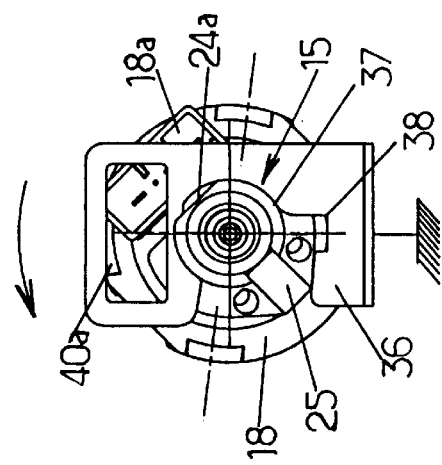
Figure 13:
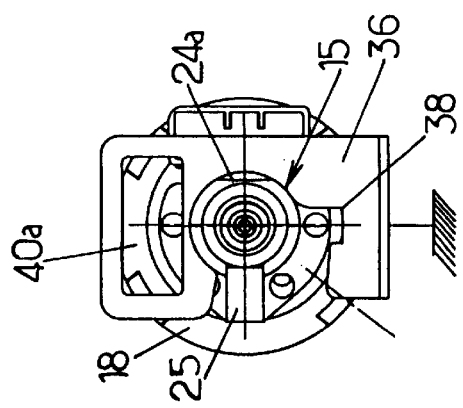

Each of these two cradles 11d has an internal bearing surface 37 that is substantially identical to the outline of the sleeves 15, and also has an opening 39 of width which is greater than the outside diameter of the second tubular portion 24 of each sleeve 15. The internal bearing surface 37 of each cradle 11d also has a notch 38 that is complementary in shape to the key 25 formed on the second tubular portion 24 of each sleeve 15. Thus, as shown in FIG. 12, the casing 18 is presented in such a manner that the flats 24a on the sleeves 15 are disposed in register with the openings 39 of the support plates 36. The casing 18 is then moved in translation towards the support plates 36 so that the sleeves 15, or more exactly the second tubular portions 34 thereof, are inserted into the two cradles 11d, as shown in FIG. 13. Once the narrowest width of the outline of the sleeves 15, i.e. the outside diameter of the second tubular portions 24 of said sleeves have been inserted in the first and second cradles, then the casing 18 is turned about its central axis X through an angle of about 90° (FIGS. 14 and 15) in such a manner that the keys 25 on the sleeves 15 deform elastically and engage by snap-fastening in the notches 38 of the cradles 11d.

Advantageously, at least one of the support plates 36 also has a passage 40a disposed facing the electrical connector 18a provided on the casing 18, once the sleeves 15 have been snap-fastened in the cradles 11b. This passage 40a is also designed to receive the second electrical connector 35 and to co-operate therewith to block at least one of the sleeves in its snap-fastened position relative to the cradles 11d so as to prevent the casing 18 from rotating relative to the two support plates 36. It will thus be understood that by preventing any accidental rotation of the casing 18 relative to the support plates 36, the keys 25 on the sleeves are prevented from escaping from the notches 38 in the cradles 11d.

In a variant embodiment of the invention, both projecting endpieces 20 and their keys 21 can likewise be integrally formed with the casing 18 of the motor 17. Similarly, each endpiece 20 can be made without a key 21. In which case, the sleeves 15, or more exactly the inside walls of the second portions 24 of the sleeves 15 are fixed directly to the endpieces 20 by adhesive or by any other appropriate means for preventing the sleeves from moving angularly relative to the casing 18.

Finally, the adjustment device R of the invention could naturally be used for driving adjustment mechanisms other than runners, in particular mechanisms for adjusting the angle of inclination of a seat back, the height of a seat proper, etc.

We claim:

1. A motor-driven adjustment device for a vehicle seat, the device comprising firstly a motor comprising a casing with two projecting endpieces which are rigid and opposite, being in alignment on a central axis, at least one of the endpieces having a rotary outlet member passing therethrough, and secondly a support to which the casing of the motor is fixed, said two endpieces of the casing being received in non-rotatable manner in first and second viscoelastic sleeves which are resiliently engaged in respective first and second cradles formed on support plates constituting the support, and said first and second cradles and the first and second sleeves are of shapes adapted to prevent the casing from moving on the support angularly, axially and radially relative to the central axis, said casing being connected to the support solely by means of the sleeves.

2. A device according to claim 1, in which each sleeve has an end provided with a flange, said flange being disposed between one of the cradles of the support and the casing of the motor so as to prevent the motor from moving axially relative to the support.

3. A device according to claim 1, in which each of said first and second cradles has a cylindrical internal bearing surface of diameter substantially identical to the outside diameter of the first and second sleeves and has an opening of a width that is less than the outside diameter of the first and second sleeves so as to enable the casing to be snap-fastened to the support and prevented from moving radially relative thereto.

4. A device according to claim 3, in which the first and second cradles are provided with respective notches for co-operating with respective keys formed on the outlines of the corresponding first and second sleeves so as to prevent the casing from moving angularly relative to the support.

5. A device according to claim 1, in which the outlet member of the motor comprises a rotary cable surrounded by a flexible sheath.

6. A device according to claim 5, in which the flexible sheath is stuck to the inside of the corresponding sleeve.

7. A device according to claim 5, in which the flexible sheath is stuck to the inside of the corresponding endpiece of the casing.

8. A device according to claim 1, in which each rigid endpiece is provided with an external key received in a groove of complementary shape formed inside the corresponding sleeve in order to prevent said sleeve from moving angularly relative to the endpiece.

9. A device according to claim 1, in which the two support plates are made as a single piece.

10. A device according to claim 1, in which the second cradle is formed by a window having a closed outline substantially identical to the outline of the second sleeve, the second sleeve being elastically engaged in said window, and the first cradle has an internal bearing surface substantially identical to the outline of the first sleeve together with an opening of width that is smaller than the outline of said first sleeve so as to enable said first and second sleeves to be inserted to said first cradle and prevented from moving radially relative thereto.

11. A device according to claim 1, in which each of the first and second cradles has an internal bearing surface that is substantially identical to the outline of the first and second sleeves, together with a respective opening of width greater than the smallest width of the outline of said first and second sleeves so as to enable said first and second sleeves to be inserted in the first and second cradles, and the first and second sleeves are provided with respective keys for snap-fastening in corresponding notches formed in the internal bearing surfaces of the first and second cradles, by turning the casing of the motor about its central axis.

12. A device according to claim 1, in which the support plate of the first cradle has a passage which, when the first sleeve is snap-fastened to the first cradle, is disposed in register with a first electrical connector provided on the casing of the motor, said passage being designed to receive a second electrical connector connected to the first electrical connector and designed to co-operate with said second electrical connector to lock the first sleeve in a snap-fastened position relative to the first cradle.

13. A device according to claim 12, in which the passage comprises two branches disposed on either side of the opening of the first cradle, said branches having respective free ends extending towards each other so as to enable the second electrical connector to be put into abutment between the first sleeve and said branch ends extending towards each other.

* * * * *